US011605927B2

(12) United States Patent
Lin

(10) Patent No.: US 11,605,927 B2
(45) Date of Patent: Mar. 14, 2023

(54) CRIMPING HANDTOOL

(71) Applicant: JETOOL CORP., New Taipei (TW)

(72) Inventor: Kai-Yen Lin, New Taipei (TW)

(73) Assignee: JETOOL CORP., New Taipei (TW)

( * ) Notice: Subject to any disclaimer, the term of this patent is extended or adjusted under 35 U.S.C. 154(b) by 0 days.

(21) Appl. No.: 17/518,558

(22) Filed: Nov. 3, 2021

(65) Prior Publication Data

US 2022/0059981 A1 Feb. 24, 2022

Related U.S. Application Data

(62) Division of application No. 16/215,650, filed on Dec. 11, 2018, now Pat. No. 11,205,882.

(30) Foreign Application Priority Data

Aug. 16, 2018 (TW) ................................ 107128646

(51) Int. Cl.
*B23P 19/00* (2006.01)
*H01R 43/042* (2006.01)

(52) U.S. Cl.
CPC ................................ *H01R 43/0425* (2013.01)

(58) Field of Classification Search
CPC .................................................. H01R 43/0425
See application file for complete search history.

(56) References Cited

U.S. PATENT DOCUMENTS 4,934,204 A * 6/1990 Hadden, Sr. .............. B25B 7/12 74/105
7,120,997 B2 * 10/2006 Islam ................. H01R 43/0425 29/748
10,800,018 B2 * 10/2020 Yen ....................... B25B 27/146
2009/0011638 A1 * 1/2009 Wang .................. H01R 43/042 439/585
2011/0056026 A1 * 3/2011 Lin ...................... H01R 43/042 30/90.1
2012/0279057 A1 * 11/2012 Holliday ............. H01R 43/042 29/751
2015/0372436 A1 * 12/2015 Chou .................. H01R 43/042 29/753
2016/0167109 A1 * 6/2016 Hauw .................... B21J 15/022 29/517
2018/0015599 A1 * 1/2018 Chen ....................... B25B 5/163
2018/0062337 A1 * 3/2018 Lin .................... H01R 43/0425

* cited by examiner

*Primary Examiner* — Paul D Kim
(74) *Attorney, Agent, or Firm* — JCIPRNET

(57) ABSTRACT

A crimping hand tool configured to crimp a cable and a connector together is provided. The crimping hand tool includes a first body, a second body, a limiting member, a crimping member, and an adjustment member. The second body is pivoted to the first body. The limiting member is disposed in the second body. The crimping member is movably disposed in the second body and linked with the first body, the crimping member being partially interfered with the limiting member and having only one degree of freedom of movement along an axis. The adjustment member is disposed in the second body, rotating about the axis, and screwed with the crimping member. The adjustment member being forced by an user to adjust a position of the crimping member in the second body along the axis.

6 Claims, 20 Drawing Sheets

CRIMPING HANDTOOL

CROSS REFERENCE TO RELATED APPLICATION

This application is a divisional application of and claims the priority benefit of U.S. patent application Ser. No. 16/215,650, filed on Dec. 11, 2018, U.S. Pat. No. 11,205, 882, which claims the priority benefit of Taiwan patent application serial no. 107128646, filed on Aug. 16, 2018. The entirety of each of the above-mentioned patent applications is hereby incorporated by reference herein and made a part of specification.

BACKGROUND

Technical Field

The invention relates to a crimping hand tool.

Description of Related Art

Coaxial cables are widely applied and are often used in fields such as signal transmission, cable television system, etc. The term coaxial comes from the two conductors inside sharing a central axis. In general, cable materials used for the coaxial cables are divided into several types based on different functions and usage manners such audio transmission, broadband network connection, or cable television signal distribution. Nevertheless, due to the variety of specifications and sizes of the coaxial cables, when connectors are required to be bonded to cables, crimping pliers of different types for cables and connectors of different specifications are required to be prepared in order to crimp the connectors and cables of different specifications together.

In this way, since the number of replacement parts of a crimping hand tool is usually excessive, the crimping hand tool may not be conveniently carried around, and the replacement parts may be easily lost. As such, a user may not enjoy a convenient using experience when using the crimping hand tool. Therefore, how a crimping hand tool may be designed based on a simple structure to enhance portability and convenience of the crimping hand tool for users is an important issue in this field.

SUMMARY

The invention provides a crimping hand tool having a simple structure and capable of providing enhanced portability and facilitating operation for a user.

A crimping hand tool provided by an embodiment of the invention is configured to crimp a cable and a connector together. The crimping hand tool includes a first body, a second body, a crimping module, and a linking member. The second body is pivoted to the first body, and at least one of the first body and the second body is adapted to be open and close with respect to each other. The crimping module includes a base, an adjustment member, and a crimping member. The base is adapted to be moved along an axis. The adjustment member is rotatably disposed at the base along the axis. The crimping member is movably assembled to the base along the axis. The crimping member penetrates the adjustment member and being screwed therewith. The base has a first limiting structure, and the crimping member has a second limiting structure. When the adjustment member is applied by a force to rotate about the axis and drives the crimping member, the first limiting structure and the second limiting structure are fitted to each other so that the crimping member moves along the axis only without rotating. The linking member is pivoted to the first body and the base. After the cable and the connector are received in the second body, the first body and the second body are pivoted with respect to each other by a force to move the base along the axis through the linking member and crimp the cable and the connector together by the crimping member.

In an embodiment of the invention, the limiting member is a recess disposed in the second body and extending along the axis, and the crimping member has a protrusion movably coupled to the recess along the axis.

In an embodiment of the invention, the limiting member is movably disposed in the second body along the axis, the crimping member and the adjustment member are disposed on the limiting member, the limiting member has a first limiting structure, the crimping member has a second limiting structure, and the first limiting structure and the second limiting structure are fitted to each other so that the crimping member moves along the axis only without rotating when the adjustment member being rotated about the axis.

In an embodiment of the invention, the first limiting structure is a groove in the limiting member extending along the axis, and the second limiting structure is a protruding portion of the crimping member movably coupled to the groove.

In an embodiment of the invention, the first limiting structure is a protruding switch structure or a switch channel in the limiting member, the second limiting structure is the switch channel or the protruding switch structure of the crimping member, and the protruding switch structure being movably adapted to the switch channel.

In an embodiment of the invention, the first limiting structure is a protruding portion on an inner wall in the limiting member, the second limiting structure is a side plane of the crimping member, and the protruding portion being movably adapted to the side plane.

In an embodiment of the invention, the limiting member is a base of a crimping module, and the crimping module further comprises the adjustment member and the crimping member, wherein the adjustment member is rotatably disposed at the base about the axis, and the crimping member is movably assembled to the base along the axis.

To sum up, the crimping hand tool includes a first body, a second body, a crimping module, and a linking member. The crimping module is disposed in the second body of the crimping hand tool, and the crimping module includes the movable base and the adjustment member and the crimping member assembled on the base. Since the crimping member penetrates the base and is screwed with the adjustment member, the position of the crimping member in the body can be changed through operating on the adjustment member. That is, through the adjustment member, the user may enable the crimping member to be adjusted to a corresponding state matched with the required sizes and specifications. In this way, even if the sizes and specifications of the coaxial cable change, the user only has to perform the adjustment action, and then the crimping member is enabled to be matched with the different sizes and specifications of the coaxial cable. It thus can be seen that a simple structure may enable the state of the crimping hand tool to be changed to correspond to the coaxial cable. Therefore, inconvenience caused by the need of preparing different replacement parts at any time is avoided, and convenience and crimping efficiency of the crimping hand tool are enhanced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
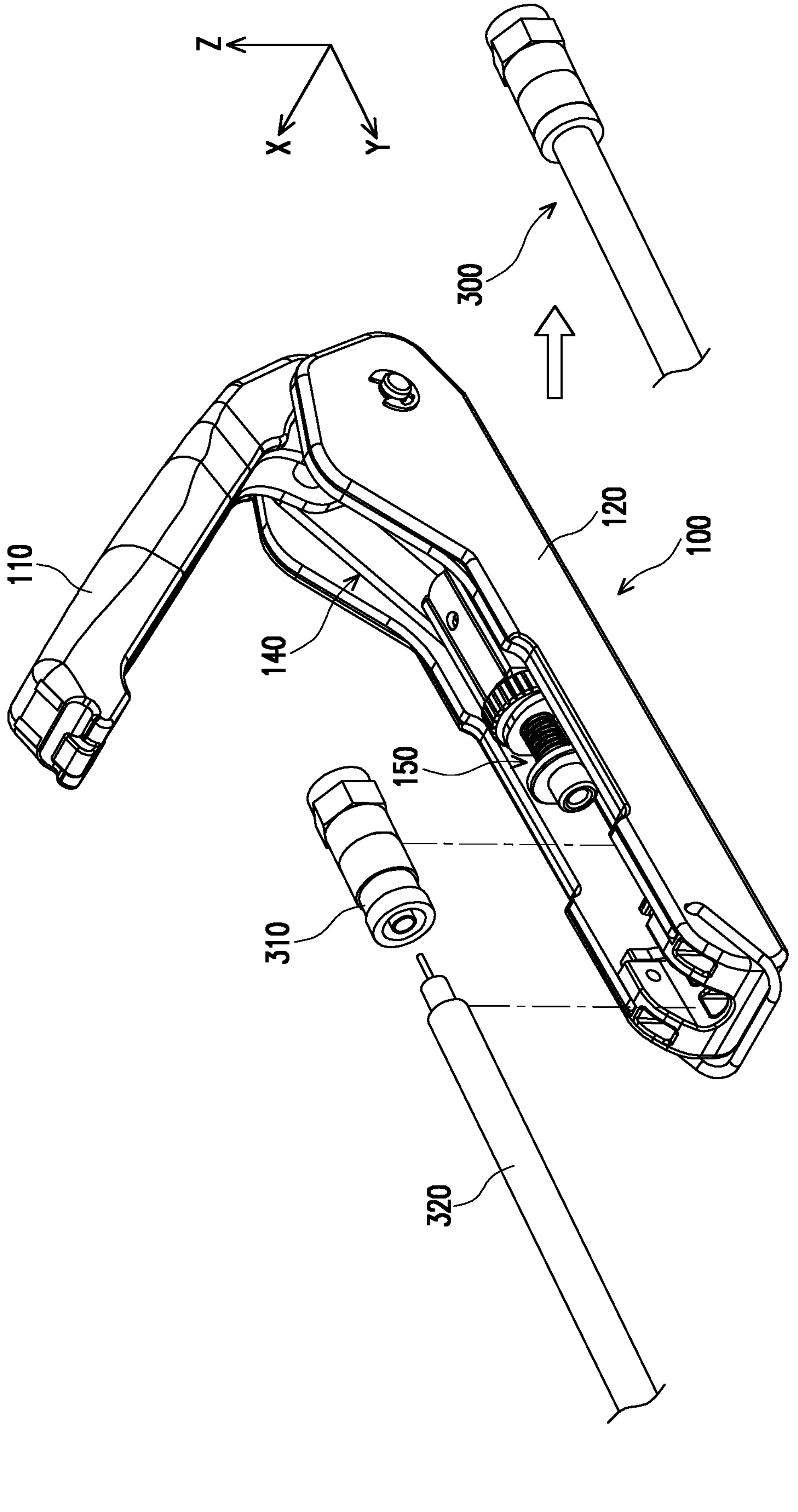
FIG. 1 is a schematic view of a crimping hand tool according to an embodiment of the invention.
Figure 2:
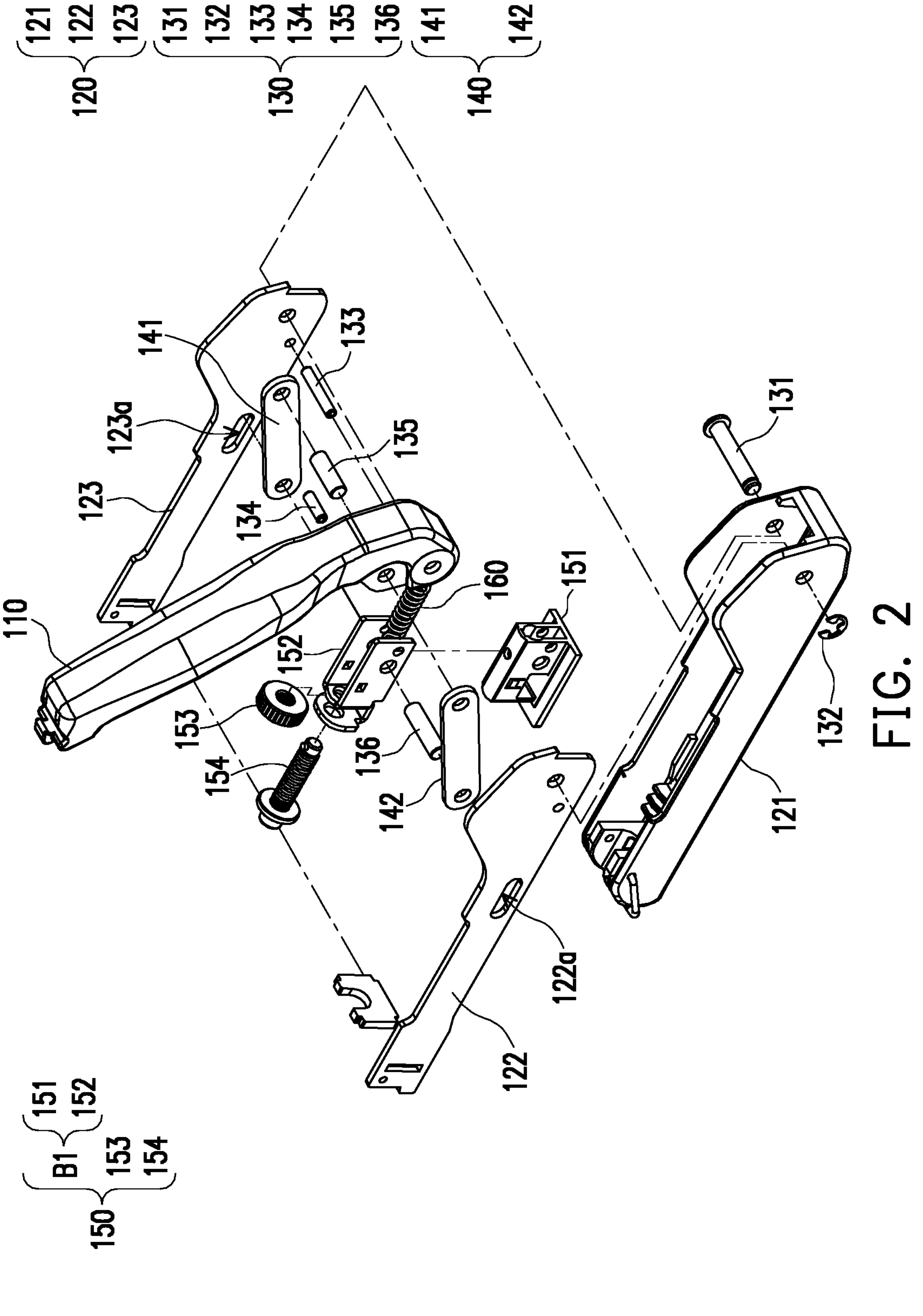
FIG. 2 is an exploded view of the crimping hand tool of FIG. 1.

FIG. 1 is a schematic view of a crimping hand tool according to an embodiment of the invention. FIG. 2 is an exploded view of the crimping hand tool of FIG. 1. A Cartesian coordinate system X-Y-Z is provided herein for description of members, and the Cartesian coordinate system X-Y-Z may also be referred to in the following drawings. With reference to FIG. 1 and FIG. 2, in this embodiment, a crimping hand tool 100 is configured to crimp a cable 320 of a coaxial cable 300 and a connector 310 together. The crimping hand tool 100 includes a first body 110, a second body 120, a connection assembly 130, a linking assembly 140, and a crimping module 150. The first body 110 and the second body 120 are pivoted through a connection member 131 and a securing member 132 of the connection assembly 130 and thereby may be rotated to open or close about an X-axis. The second body 120 includes a part 121, a part 122, and a part 123. The part 121 has a concave channel structure, and the plate-shaped part 122 and part 123 are disposed at two opposite side walls of the concave channel structure. The linking assembly 140 and the crimping module 150 are disposed in the concave channel structure and are located between the part 122 and the part 123.

The linking assembly 140 includes a linking member 141 and a linking member 142 located at two opposite sides of the first body 110 along the X-axis. Herein, one end of the linking member 141 and one end of the linking member 142 are pivoted to the first body 110 through a connection member 135 of the connection assembly 130, and another end of the linking member 141 and another end of the linking member 142 are pivoted to the crimping module 150 through a connection member 136 of the connection assembly 130. Note that the connection member 136 is further coupled to an expansion hole 122*a* of the part 122 and an expansion hole 123*a* of the part 123. The expansion hole 122*a* and the expansion hole 123*a* substantially extend along a Y-axis, similar to a movable axial direction of the base in the second body 120, and thereby, rotational movement of the linking assembly 140 may be converted into linear movement of a base.

Accordingly, when the first body 110 and the second body 120 are applied by a force to pivot to be a close state, the linking assembly 140 drives the crimping module 150, so the crimping module 150 may smoothly move in the concave channel structure of the second body 120 along the Y-axis, and a crimping action is thereby performed. When the cable 320 of the coaxial cable 300 is sleeved into the connector 310, the cable 320 of the coaxial cable 300 and the connector 310 are placed into the concave channel structure, so that the cable 320 and the connector 310 may be crimped together through the crimping action, as shown in FIG. 1.

Figure 3A:
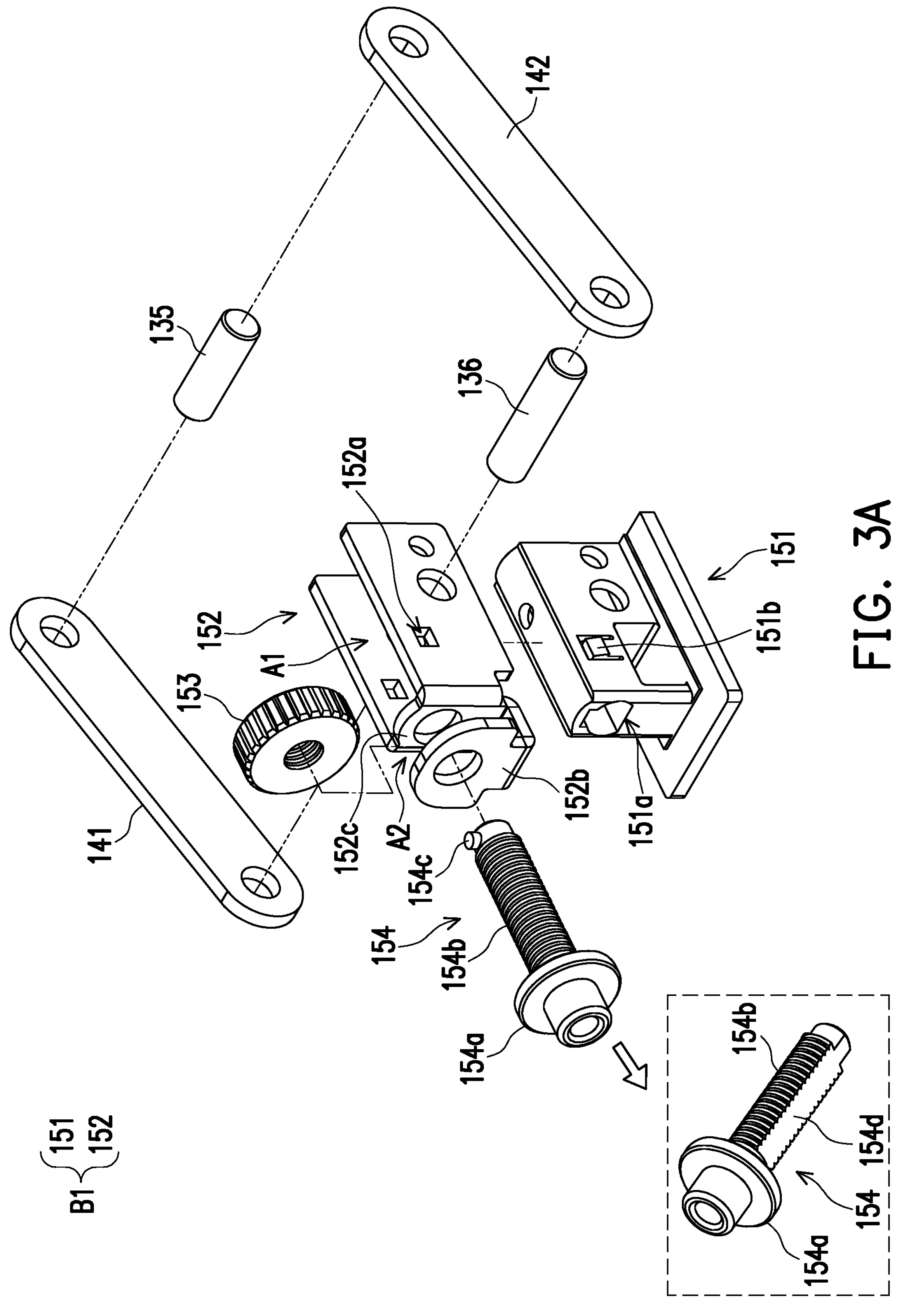
FIG. 3A is a crimping module of FIG. 2 depicted from another view angle.
Figure 3B:
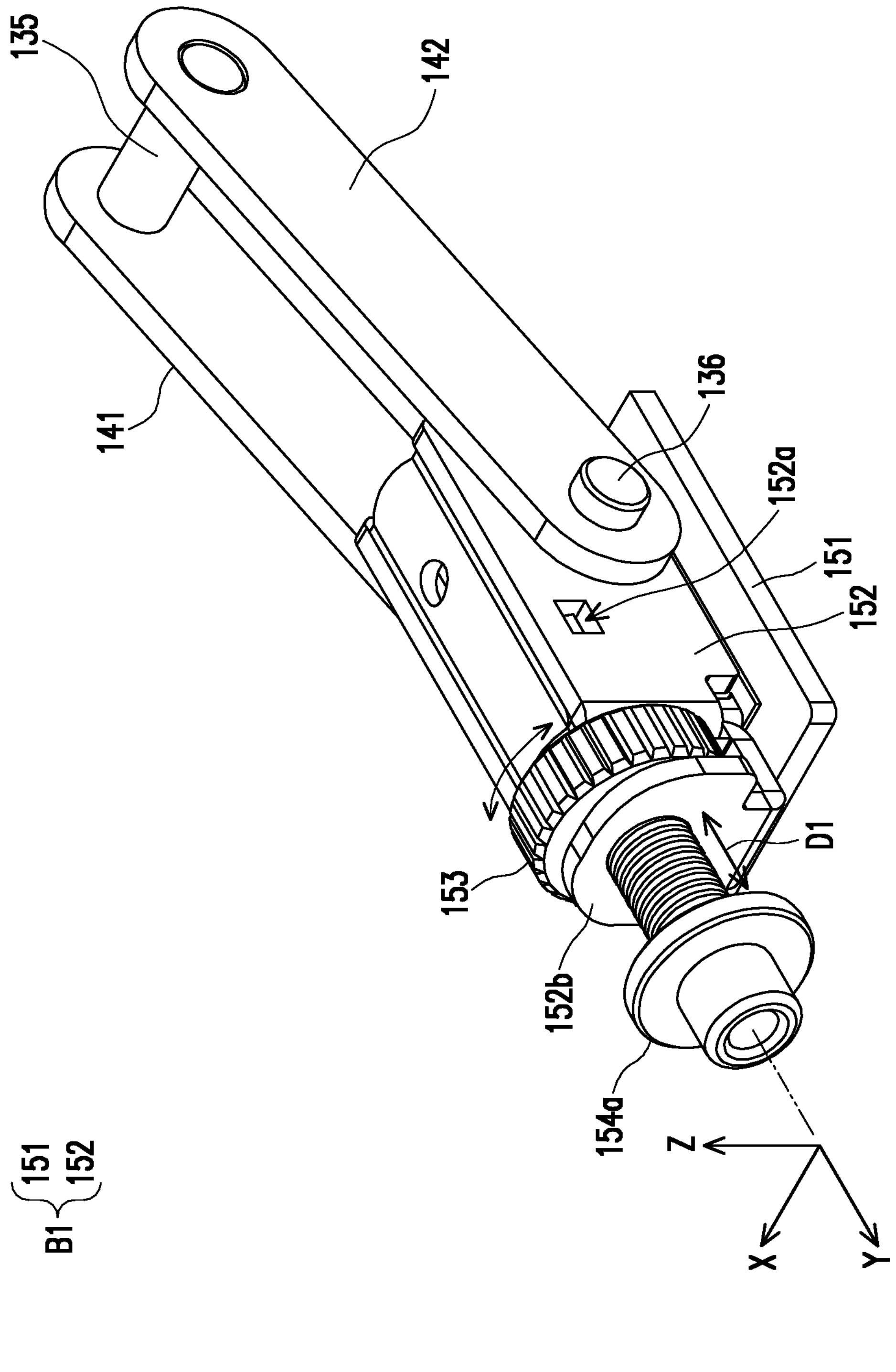
FIG. 3B is a schematic view illustrating assembly of the crimping module of FIG. 3A.
Figure 3C:
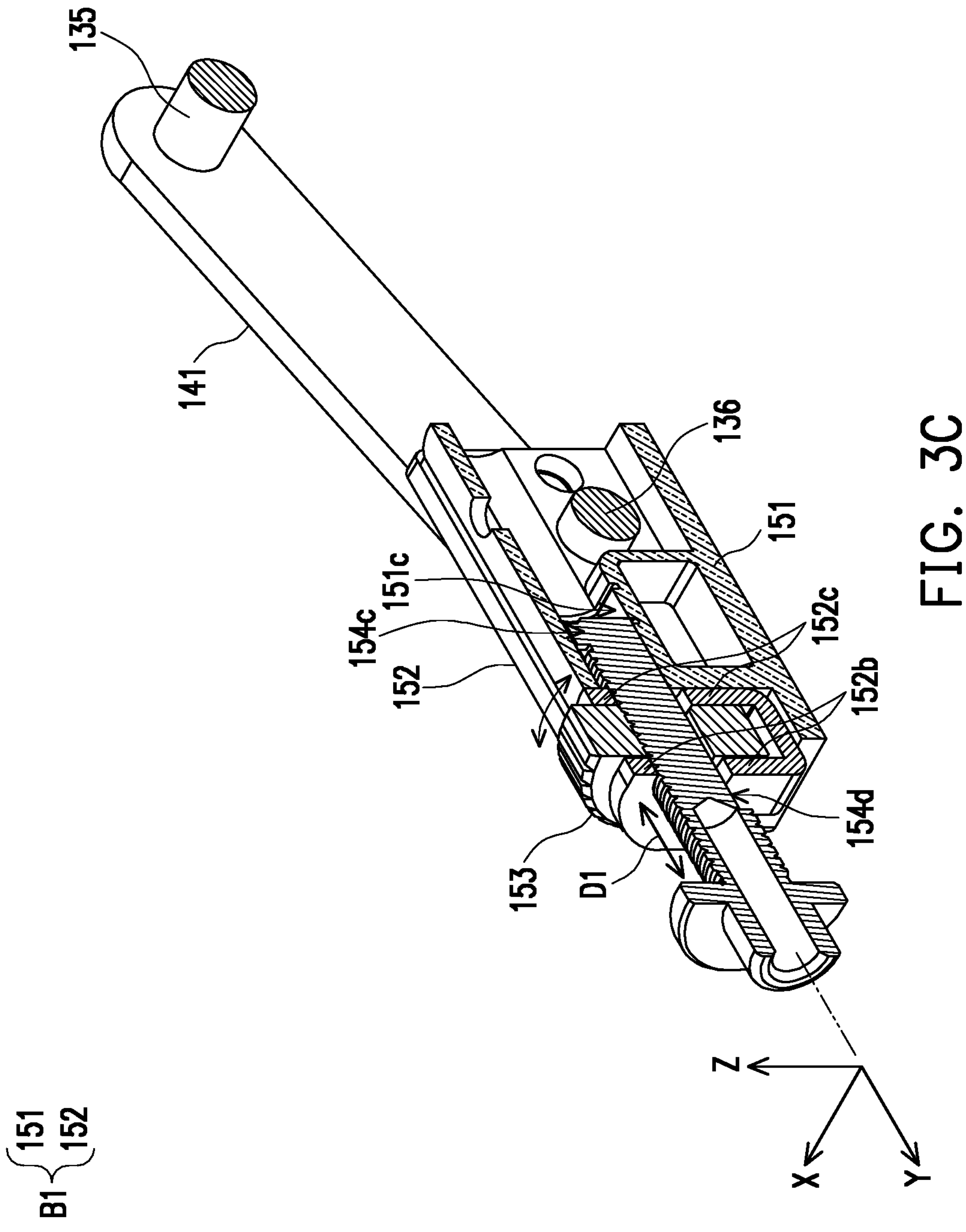
FIG. 3C is a cross-sectional view illustrating the crimping module of FIG. 3B.

FIG. 3A is the crimping module of FIG. 2 depicted from another view angle. FIG. 3B is a schematic view illustrating assembly of the crimping module of FIG. 3A. FIG. 3C is a cross-sectional view illustrating the crimping module of FIG. 3B. With reference to FIG. 3A to FIG. 3C together, in this embodiment, the crimping module 150 is movably disposed in the second body 120 along the Y-axis. The crimping module 150 includes a base B1, an adjustment member 153, and a crimping member 154, and the base B1 is constituted by a first member 151 and a second member 152. A bottom portion of the first member 151 is movably disposed in the second body 120, and the first member 151 has an engaging portion 151*b*. The second member 152 has an engaging hole 152*a*, and as the engaging portion 151*b* is matched with the engaging hole 152*a*, the second member 152 may be embedded onto the first member 151, and further, a structural body of the first member 151 having the engaging portion 151*b* is placed in a first region A1 of the second member 152. The adjustment member 153 is movably disposed in a second region A2 of the second member 152 along the Y-axis. The crimping member 154 penetrates the second member 152 and the first member 151 of the base and is screwed with the adjustment member 153. The adjustment member 153 is adapted to be applied by a force to rotate to drive the crimping member 154 to move. With reference to FIG. 1, the adjustment member 153 rotates about the Y-axis to accordingly drive the crimping member 154 to move along the Y-axis.

Specifically, the first member 151 of the base B1 has a first limiting structure 151*a*, and the first limiting structure 151*a* may be, for example, an opening hole with a non-circular inner contour. The crimping member 154 has a crimping portion 154*a* and a shaft 154*b*. The shaft 154*b* is a screw shaft, and the crimping portion 154*a* is located at one end of the screw shaft away from the base B1. The screw shaft is configured to be fitted to an internal thread of the adjustment member 153, so that the rotational movement of the adjustment member 153 may be converted into linear movement of the screw shaft. Further, a bottom portion of the shaft 154*b* of the crimping member 154 has a second limiting structure 154*d*, such as the crimping member 154 depicted from another view angle in FIG. 3A. That is, a cross section of the shaft body 154*b* has a non-circular outer contour, and the non-circular inner contour of the first limiting structure 151*a* is fitted to the non-circular outer contour of the second limiting structure 154*d*. Herein, the second limiting structure 154*d* may be regarded as a plane of the bottom portion of the shaft body 154*b*, so that when the crimping member 154 penetrates the first member 151, the second limiting structure 154*d* may be movably coupled to the first limiting structure 151*a* (that is, a plane inside the opening hole).

As described above, since the shaft 154*b* and the adjustment member 153 are matched with each other, as such, when a user rotates the adjustment member 153, the crimping member 154 is driven at the same time. Nevertheless, with presence of the first limiting structure 151*a* and the second limiting structure 154*d*, the crimping member 154 can move only without rotating when being driven. That is, with reference to FIG. 1, the adjustment member 153 is rotated about the Y-axis, so that the crimping member 154 is driven to move along the Y-axis only and does not rotate about the Y-axis. In this way, an actuation conversion effect (rotational movement converted into linear movement) is smoothly generated by the adjustment member 153 and the crimping member 154 screwed with each other.

In addition, the second region A2 of the second member 152 is defined by a third limiting structure 152*b* and a third limiting structure 152*c* of the second member 152. The adjustment member 153 located in the second region A2 is thereby limited to be located between the third limiting structure 152*b* and the third limiting structure 152*c*, so movement of the adjustment member 153 is limited to rotate about the Y-axis only without moving along the Y-axis.

In this way, a distance D1 between the crimping portion 154*a* of the crimping member 153 and the third limiting structure 152*b* is to be changed as affected by rotation of the adjustment member 153. In other words, since a position of the crimping member 154 in the second body 120 can be accordingly changed, the crimping hand tool 100 of this embodiment can be adapted to different sizes of the coaxial cable 300. That is, the user does not have to carry crimping members of different sizes and specifications for replacement and is able to complete the required crimping action as the crimping hand tool 100 may be adapted to different specifications of the coaxial cable 300. Therefore, the crimping hand tool 100 delivers a more convenient using experience.

Note that the crimping member 154 also includes a protruding portion 154*c* located at one end (opposite to the crimping portion 154*a*) of the shaft 154*b*. When the shaft 154*b* of the crimping member 154 passes through the opening hole of the first member 151, the protruding portion 154*c* substantially interferes with the third limiting structure 152*c* along the Y-axis to prevent the crimping member 154 from being detached from the base B1. In assembly practices, an assembler may first insert the shaft 154*b* into the first member 151 and then install a pin into the shaft 154*b* through the opening hole on a top portion of the first member 151 to form the protruding portion 154*c*. Nevertheless, assembly means used to assemble the crimping module are not limited by the invention.

Figure 4A:
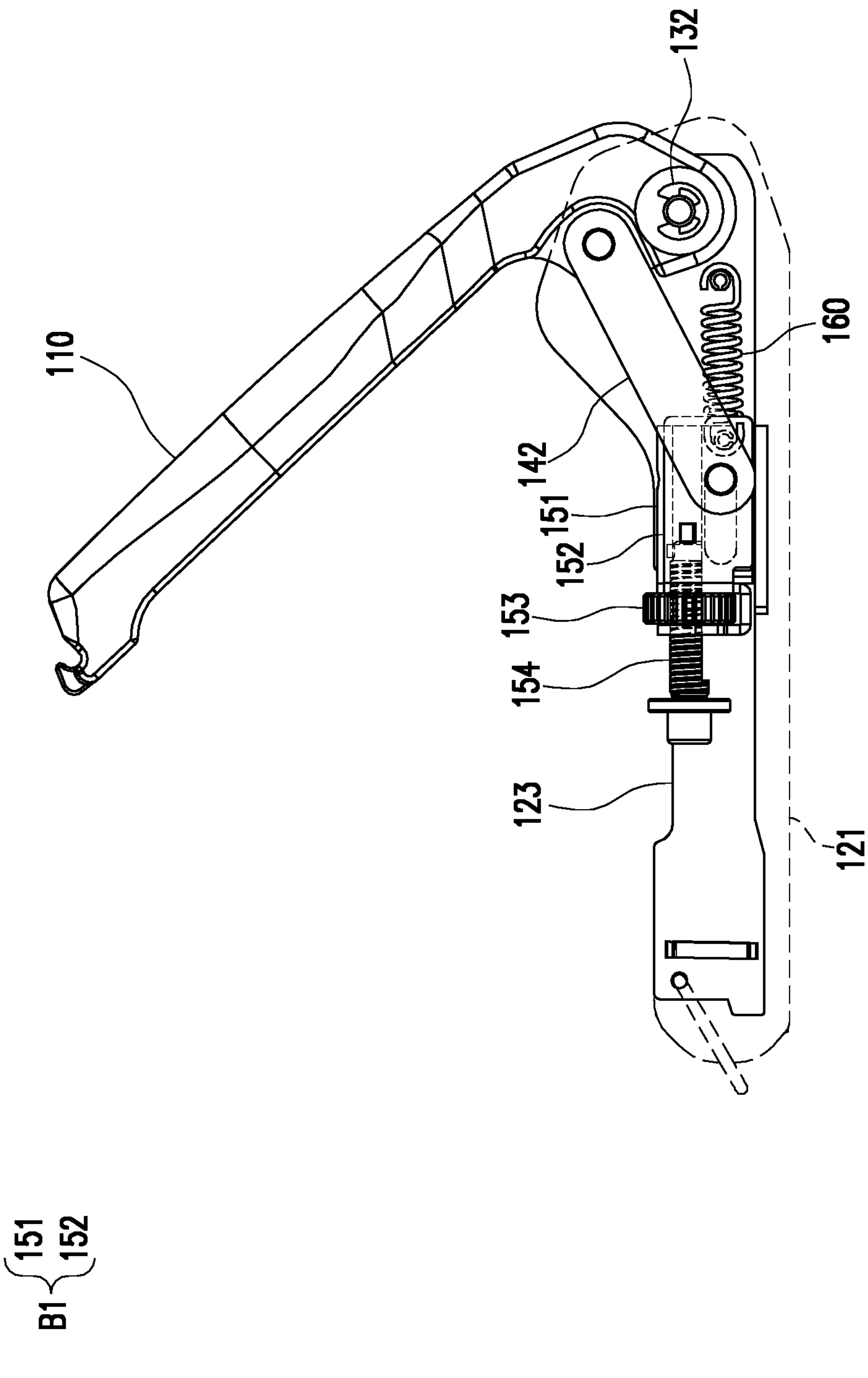
FIG. 4A and FIG. 4B illustrate an opened state of the crimping hand tool in different ways.
Figure 4B:
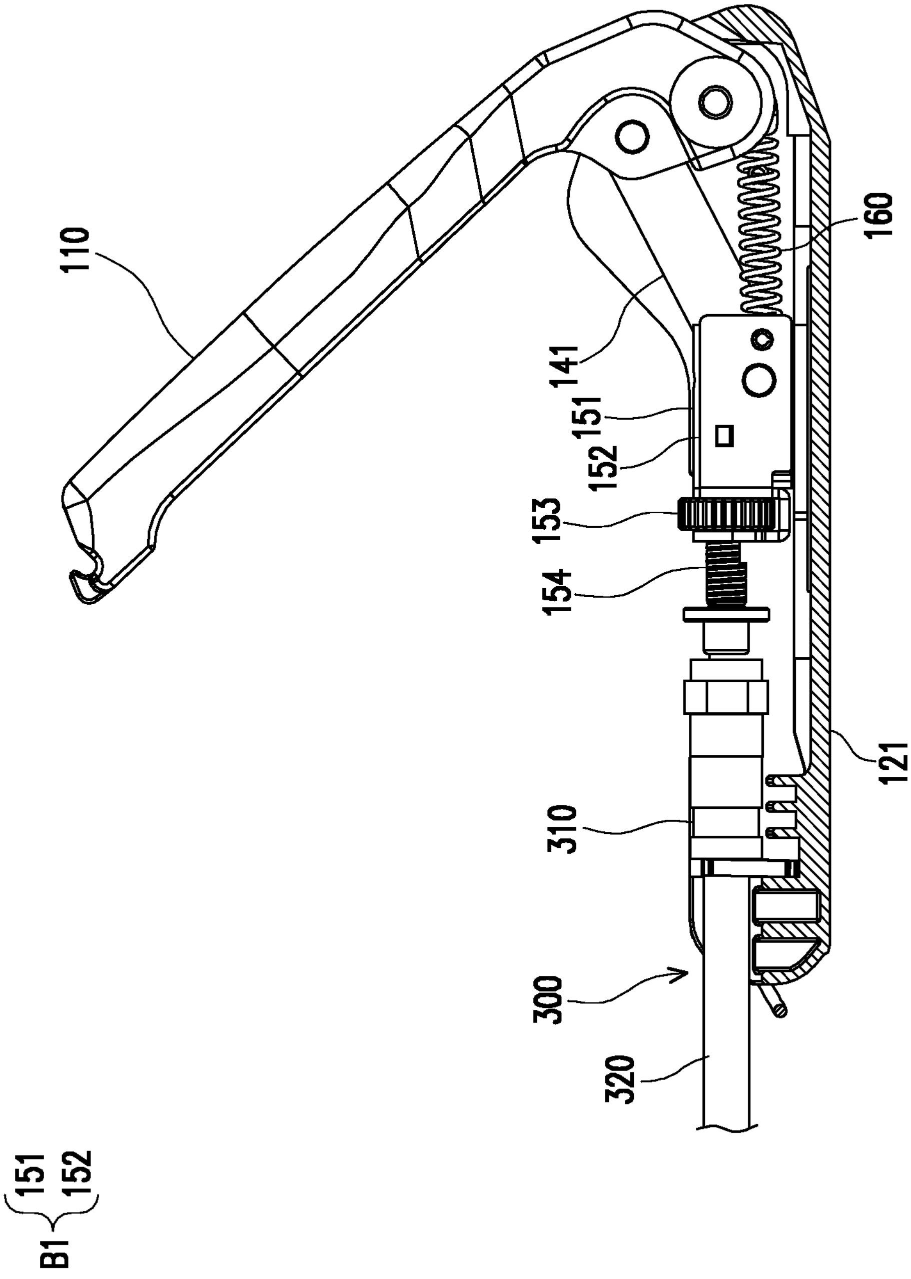
Figure 5A:
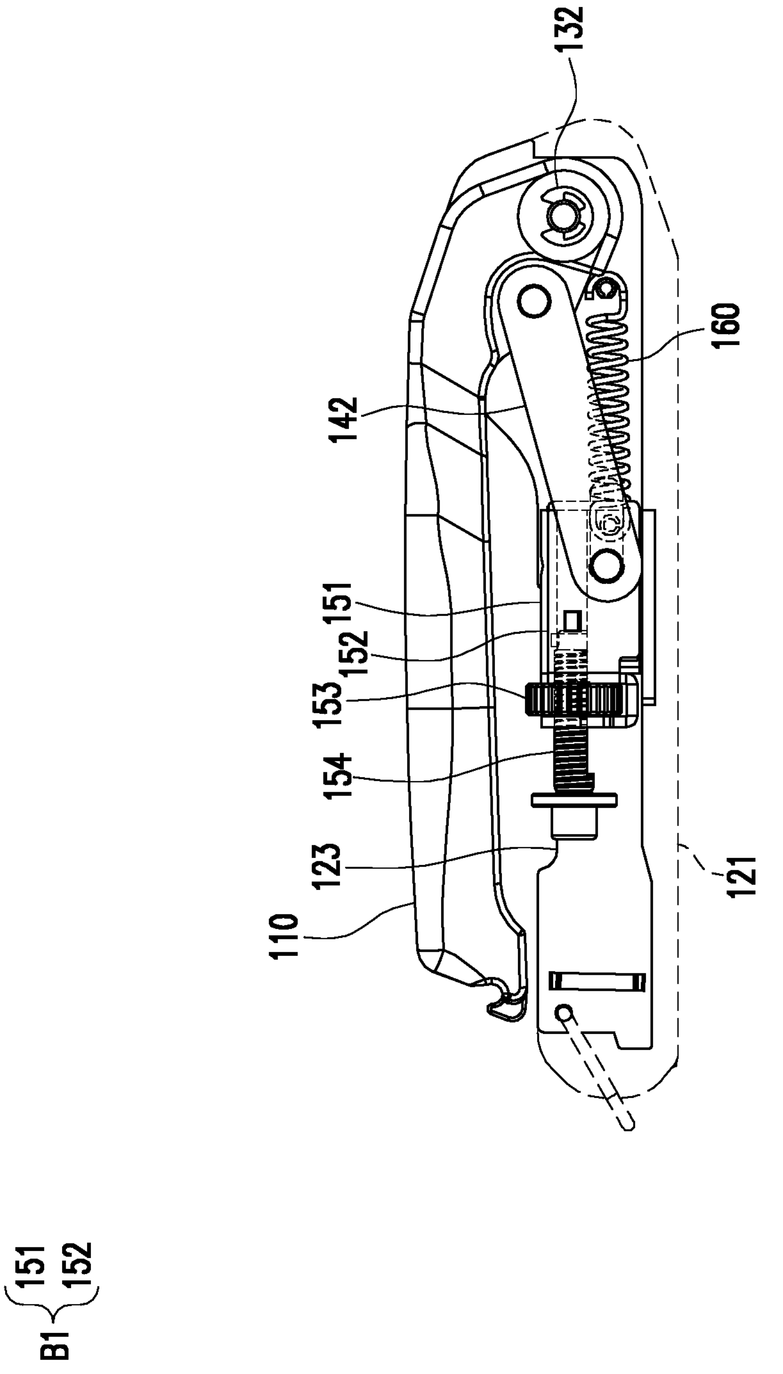
FIG. 5A and FIG. 5B illustrate a closed state of the crimping hand tool in different ways.
Figure 5B:
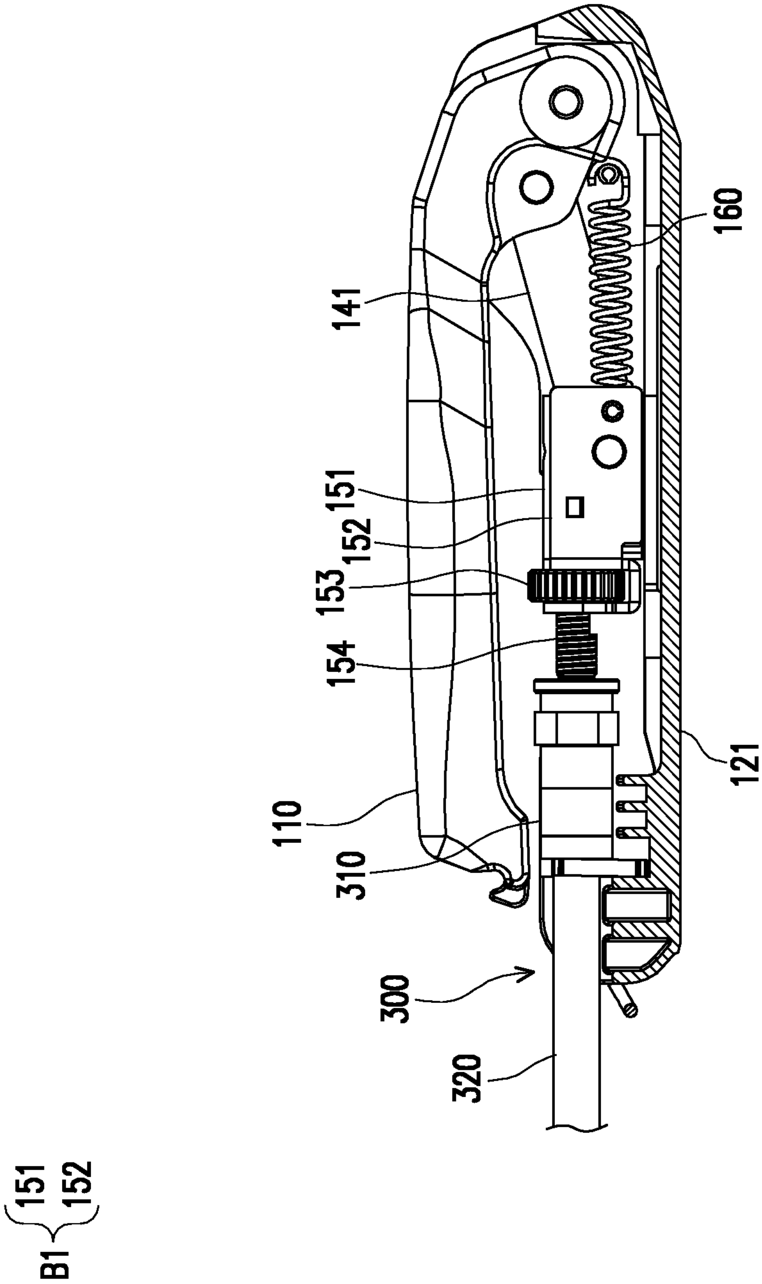

FIG. 4A and FIG. 4B illustrate an opened state of the crimping hand tool in different ways. FIG. 5A and FIG. 5B illustrate a closed state of the crimping hand tool in different ways. FIG. 4A and FIG. 5A are illustrated in perspective views, and FIG. 4B and FIG. 5B are illustrated in cross-sectional views. With reference to FIG. 4A, FIG. 4B, FIG. 5A, and FIG. 5B together, after the position of the crimping member 154 of the crimping module 150 in the second body 120 is adjusted through operating on the adjustment member 153 by the user, the corresponding coaxial cable 300 may be accordingly crimped. The following description is based on the part 121 (viewed as being stationary) of the second body 120 herein. After the cable 320 is preliminary aligned with and sleeved into the connector 310 and the cable 320 and the connector 310 are placed into the second body 120, the user applies a force to the first body 110 so that the first body 110 pivots with respect to the second body 120 to be the closed state. Similar to the features of a toggle mechanism formed by the first body 110, the second body 120, and the linking assembly 140 as described above, the first body 110 can drive the base of the crimping module 150 to move via the linking assembly 140. As such, the cable 320 and the connector 310 are further crimped together via the crimping member 154 to form the coaxial cable 300.

The crimping hand tool 100 further includes an elastic member 160. With reference to FIG. 2, one end of the elastic member 160 is connected to (between the part 122 and the part 123 of) the second body 120 through the connection member 133, and another end of the elastic member 160 is connected to the second member 152 of the base B1 through the connection member 134. After the coaxial cable 300 is moved out, the elastic member 160 accordingly enables the crimping hand tool 100 having completed the crimping action to drive the base B1 (linked to the linking assembly 140 and the first body 110) to be restored.

Figure 6:
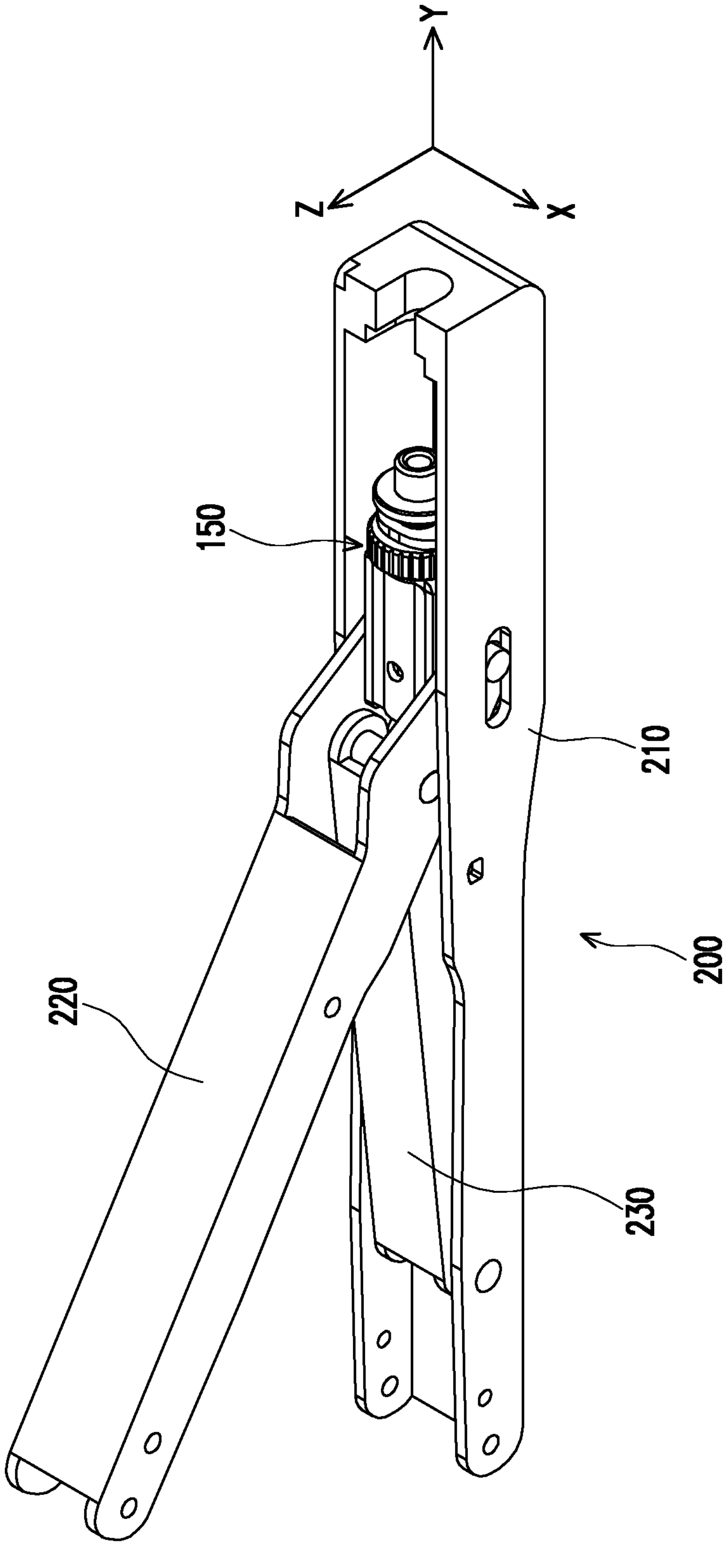
FIG. 6 is a schematic view of a crimping hand tool according to another embodiment of the invention.
Figure 7:
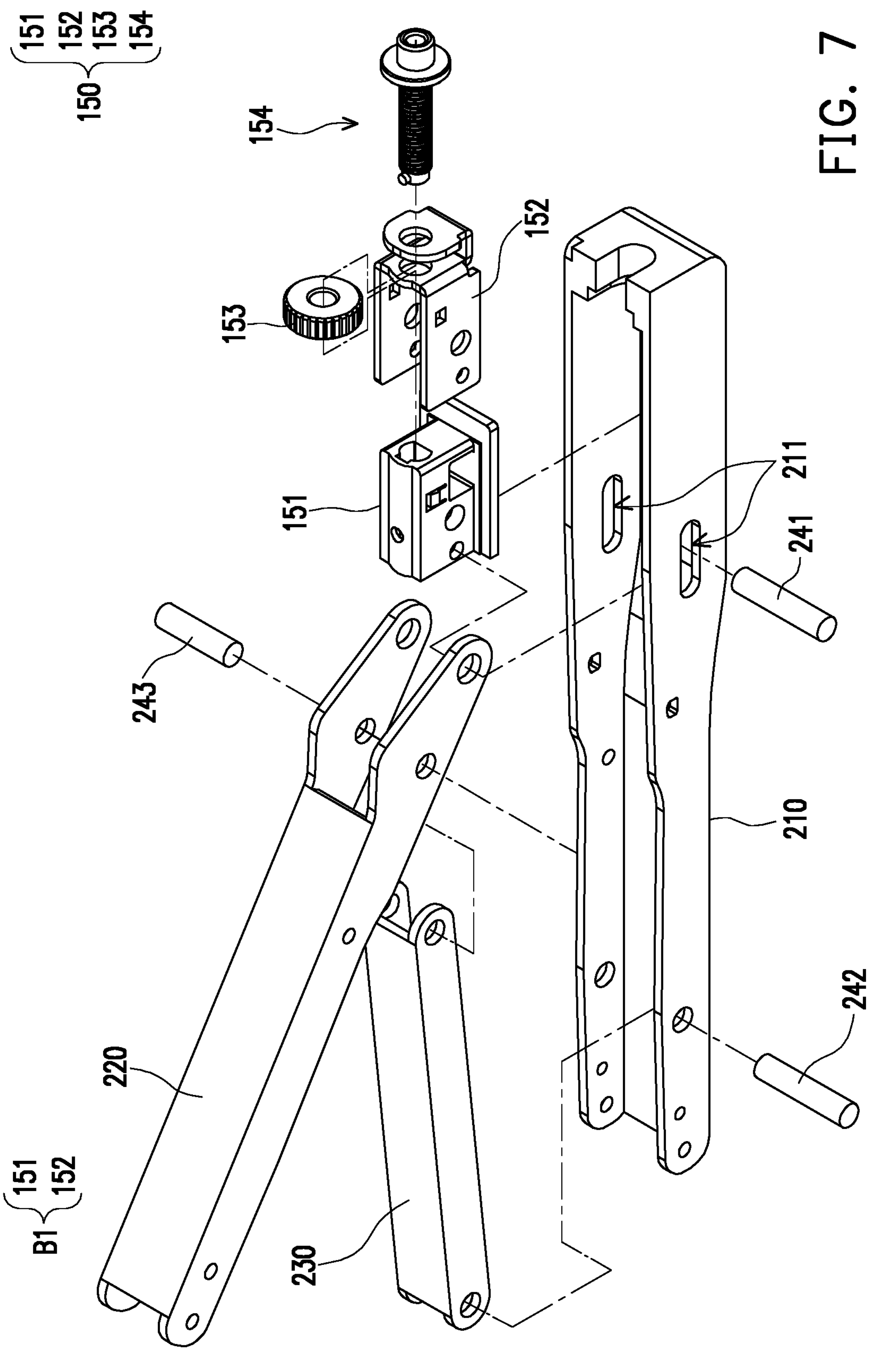
FIG. 7 is an exploded view of the crimping hand tool of FIG. 6.

FIG. 6 is a schematic view of a crimping hand tool according to another embodiment of the invention. FIG. 7 is an exploded view of the crimping hand tool of FIG. 6. With reference to FIG. 6 and FIG. 7 together, another crimping hand tool 200 is provided herein, and the crimping hand tool 200 includes a first body 210, a second body 220, connection members 241 to 243, a linking member 230, and the crimping module 150. One end of the linking member 230 is pivoted to the first body 210 through the connection member 242, and another end of the linking member 230 is pivoted to the second body 220 through the connection member 243. Further, one end of the second body 220 is movably coupled to an expansion hole 211 of the first body 210 through the connection member 241 and is coupled to the base B1 (the first member 151) of the first crimping module 150 at the same time. Herein, the crimping module 150, having the structure as described above, is movably disposed in a concave channel structure of the first body 210. Hence, an extending direction of the expansion hole 211 is identical to a moving direction of the crimping module 150. In this way, when the user applies a force to the second body 220 so that the second body 220 pivots with respect to the first body 210, the user can drive the crimping module 150 to move in the first body 210, so as to perform the crimping action on the coaxial cable 300 (shown in FIG. 1). Similarly, in this embodiment, an elastic member (e.g., a torsion spring, not shown) may be provided at any position where the first body 210, the second body 220, and the linking member 230 are pivoted, as such, the related members may be restored after the crimping action is completed.

Figure 8:
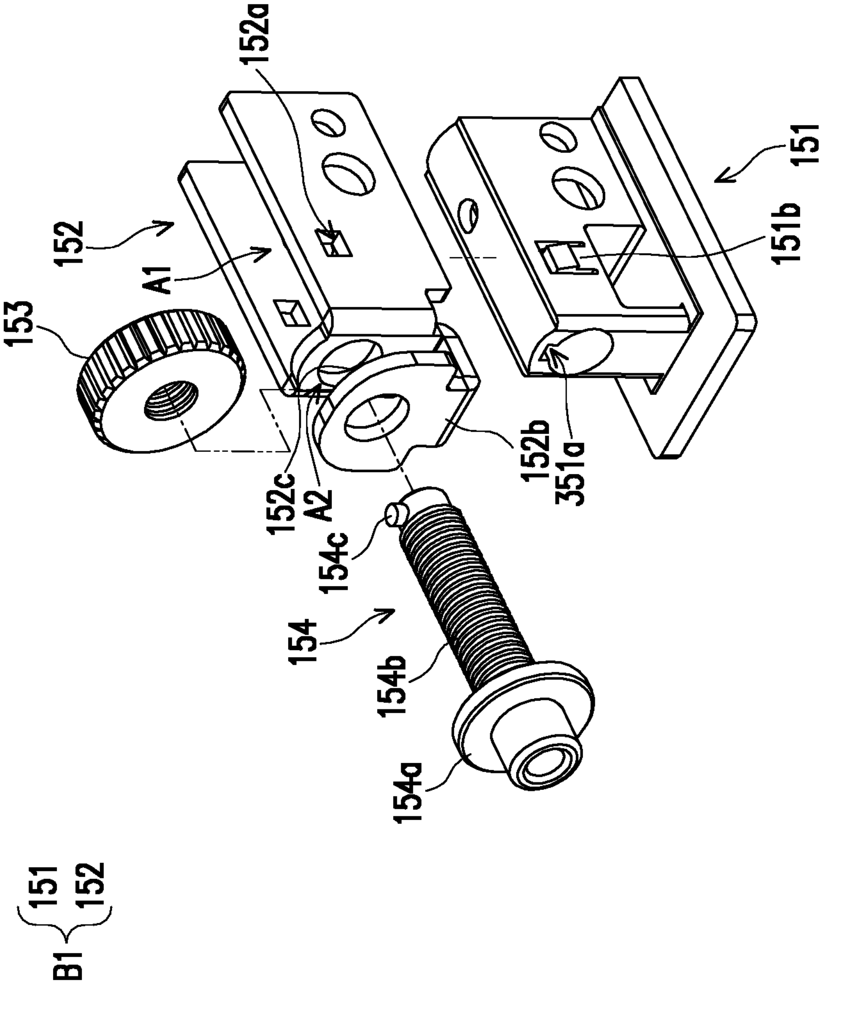
FIG. 8 is a schematic view of a crimping module according to another embodiment of the invention.

FIG. 8 is a schematic view of a crimping module according to another embodiment of the invention. With reference to FIG. 8 and FIG. 3A, different from the foregoing embodiment, in the crimping module of this embodiment, a first limiting structure 351*a* included in the first member 151 is located in the first member 151 and is a groove extending along the Y-axis (corresponding to the Cartesian coordinate system X-Y-Z shown in FIG. 1), and the protruding portion 154*c* included in the crimping member 154 is regarded as the second limiting structure. Herein, the protruding portion 154*c* is movably coupled to the groove. In this way, a movable axial direction of the protruding portion 154*c* is limited by an extending direction of the groove (substantially extending along the Y-axis), which is equivalent to providing the crimping member 154 with an interference condition which prohibits the crimping member 154 from rotating. Hence, when the adjustment member 153 provided by the present embodiment rotates, the crimping member 154 is driven by the adjustment member 153 to generate movement to move along the Y-axis only without rotating about the Y-axis.

Figure 9A:
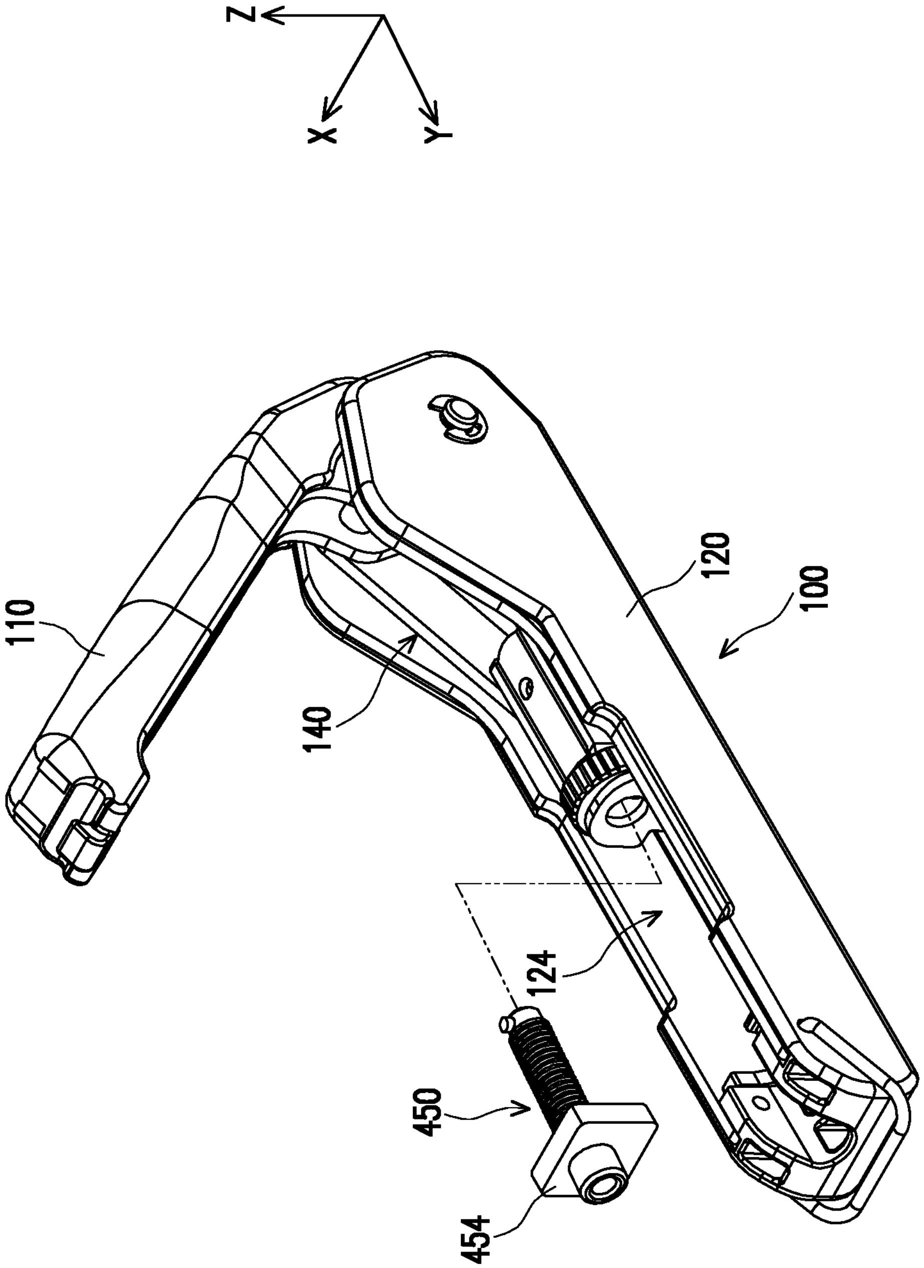
FIG. 9A is a schematic view of a crimping hand tool according to another embodiment of the invention.

FIG. 9A is a schematic view of a crimping hand tool according to another embodiment of the invention. Different from the above, in a crimping module 450 of this embodiment, a crimping member 454 interferes with the second body 120 so that the crimping member 454 moves along the Y-axis only without rotating about the Y-axis while being driven by the adjustment member 153 (identical to the description provided by the foregoing embodiment). Further, a concave channel 124 of the second body 120 is a U-shaped structure and has two side walls opposite to each other. Hence, the crimping member 454 of this embodiment is matched with an outer contour of the concave channel 124, so that an interference effect of preventing the crimping member 454 from rotating about the Y-axis may be effectively generated.

Figure 9B:
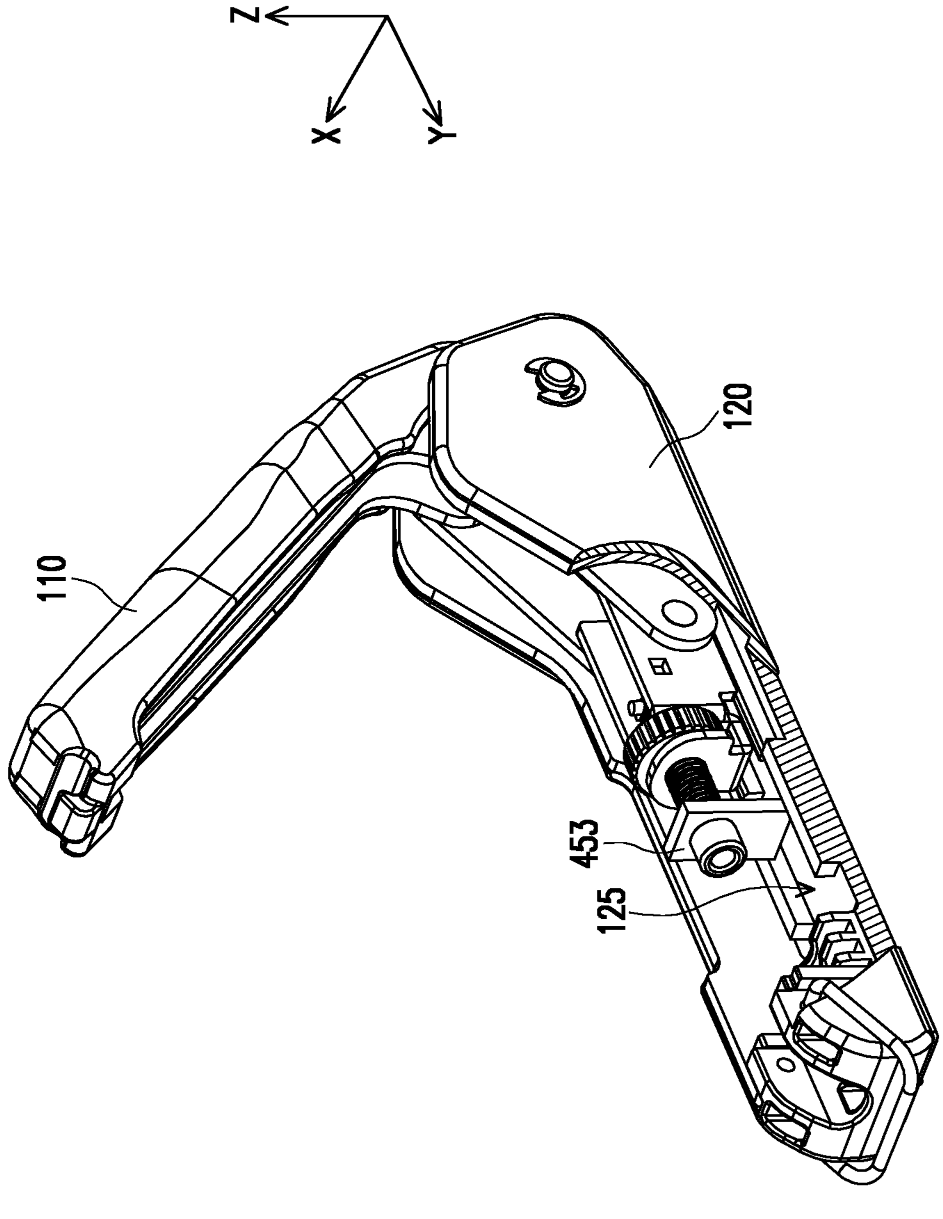
FIG. 9B is a partial cross-sectional view of a crimping hand tool according to another embodiment of the invention.

FIG. 9B is a partial cross-sectional view of a crimping hand tool according to another embodiment of the invention. In the second body 120 of this embodiment, a concave channel 125 is formed by two opposite ribs at a bottom of the second body 120, a crimping member 453 interferes with the two opposite ribs, such that the crimping member 453 moves along the Y-axis only without rotating about the Y-axis while being driven by the adjustment member 153 (identical to the description provided by the foregoing embodiment). Therefore, the crimping member 453 of this embodiment is matched with the concave channel 125, so that an interference effect of preventing the crimping member 453 from rotating about the Y-axis may be effectively generated.

Figure 10:
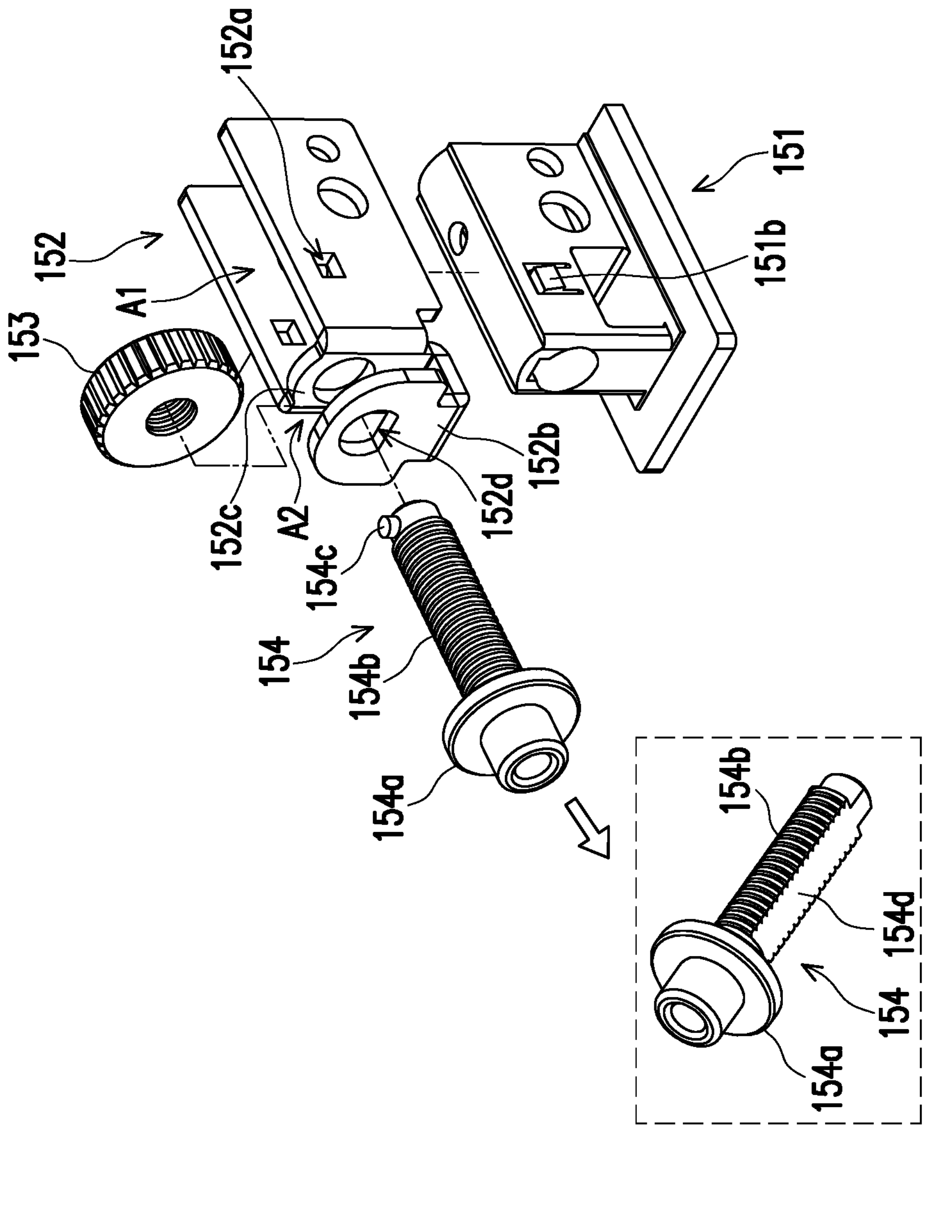
FIG. 10, FIG. 11A, FIG. 11B and FIG. 12 are exploded views of crimping modules according to different embodiments of the invention.
Figure 11A:
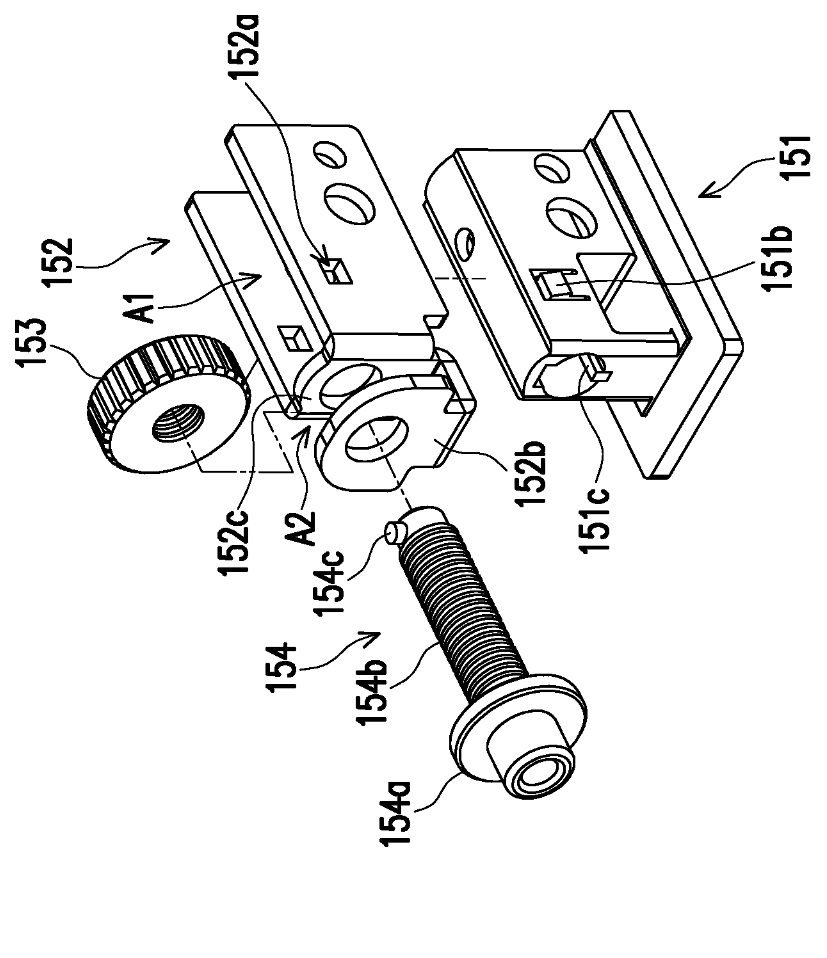
Figure 11B:
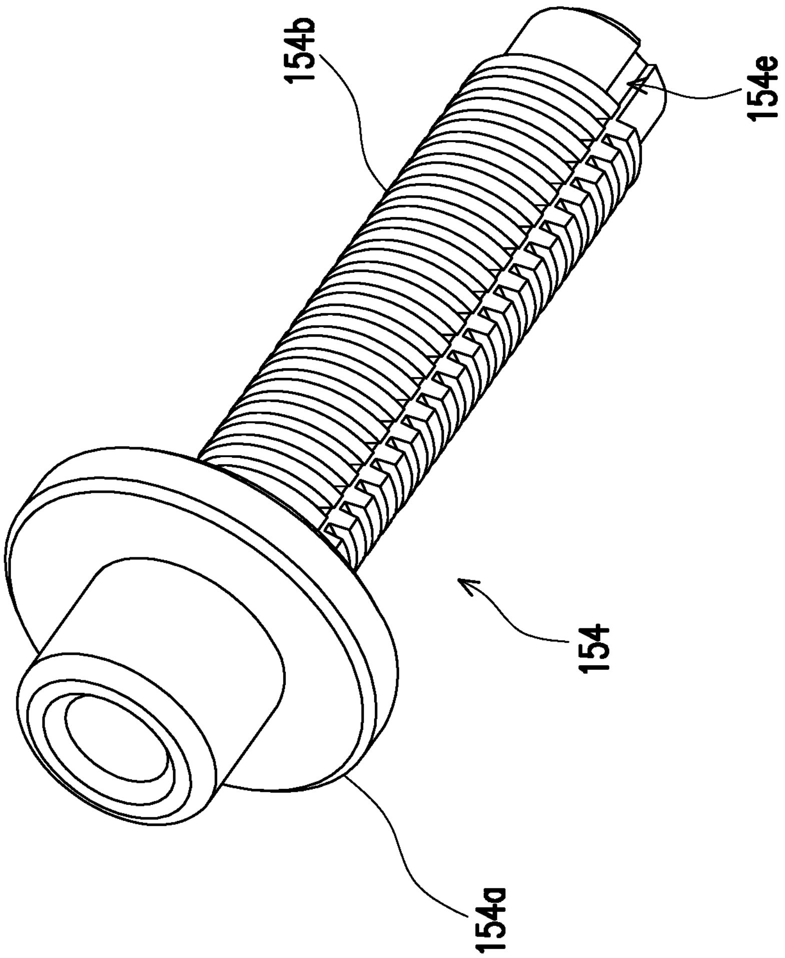
Figure 12:
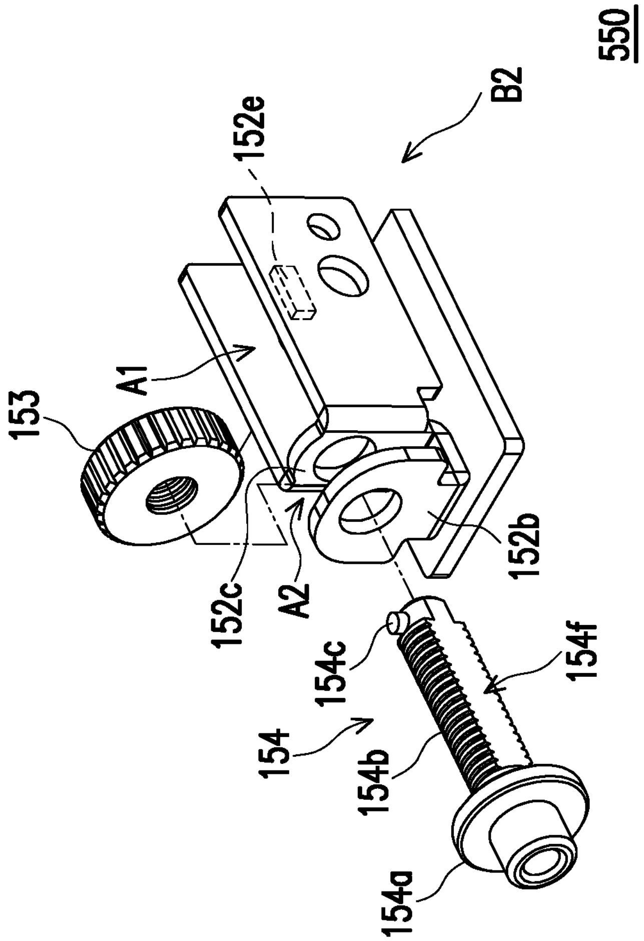

FIG. 10 to FIG. 12 are exploded views of crimping modules according to different embodiments of the invention. With reference to FIG. 10 first, in this embodiment, a first limiting structure 152*d* of the base is disposed on the third limiting structure 152*b* of the second member 152. That is, an opening hole of the third limiting structure 152*b* presents a non-circular inner contour to be fitted to the second limiting structure 154*d* of the crimping member 154, so that the interference effect of preventing the crimping member 154 from rotating about the Y-axis is generated.

With reference to FIG. 11A and FIG. 11B, the crimping member 154 of FIG. 11A is depicted from another view angle in FIG. 11B. In this embodiment, a first limiting structure 151*c* is a protruding switch structure disposed in the opening hole of the first member 151. In the crimping member 154, a switch channel located at a bottom portion of the crimping member 154 acts as a second limiting structure 154*e* to be matched with the first limiting structure 151*c*, and in this way, the interference effect of preventing the crimping member 154 from rotating about the Y-axis is generated as well.

With reference to FIG. 12, in a crimping module 550 of this embodiment, a base B2 is a single member, and a protruding portion is disposed on an inner wall of the base B2 to act as a first limiting structure 152*e* of the base B2. Correspondingly, a plane is formed on a side surface of the crimping member 154 instead to act as a second limiting structure 154*f*. When the crimping member 154 is inserted in the base B2, the first limiting structure 152*e* is propped against the second limiting structure 154*f*, so that the interference effect of preventing the crimping member 154 from rotating about the Y-axis is generated.

Figure 13A:
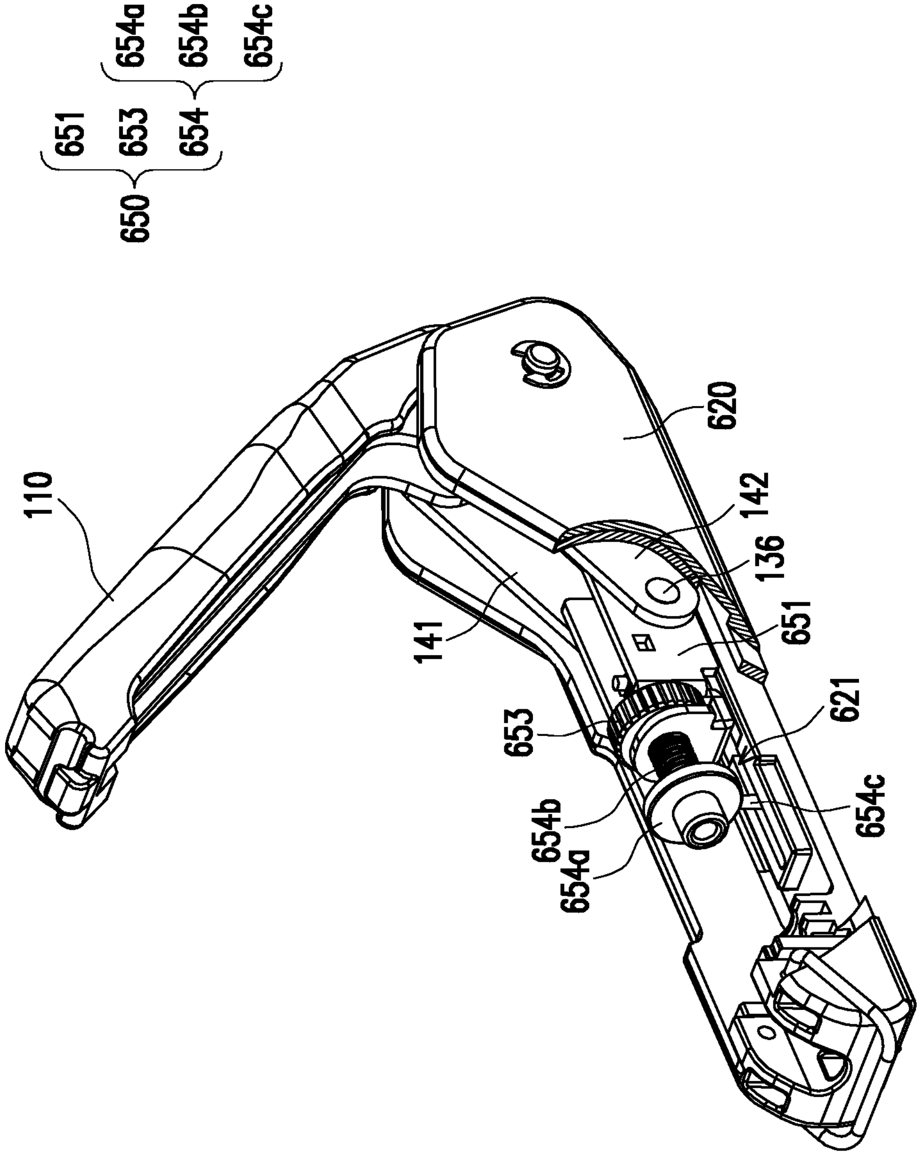
FIG. 13A and FIG. 13B illustrate partial structure of a crimping hand tool in different states according to another embodiment of the invention.
Figure 13B:
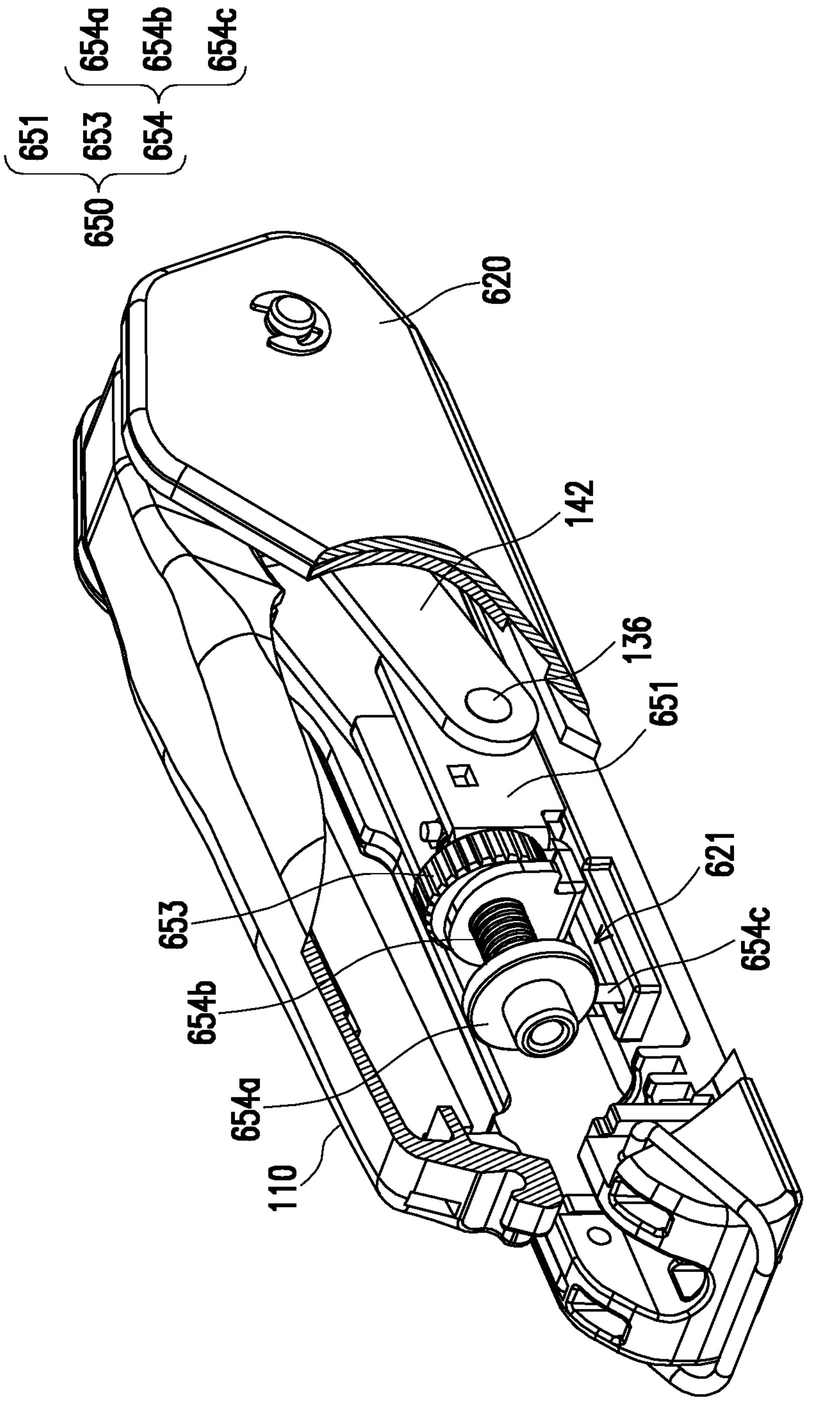

FIG. 13A and FIG. 13B illustrate partial structure of a crimping hand tool in different states according to another embodiment of the invention, wherein a portion of a second body 620 is removed so as to identify members in the second body 620 more specifically. With reference to FIG. 13A and FIG. 13B, a crimping hand tool includes a first body 100, the second body 620, a limiting member 621, a base 651, a crimping member 654, and an adjustment member 653, wherein the second body 620 is pivoted to the first body 110, the limiting member 621 is movably disposed in the second body 620, the crimping member 654 having a crimping portion 654*a* and a shaft 654*b* is movably disposed in the second body 620 and linked with the first body 110 through the linking members 141 and 142, and the adjustment member 653 is disposed in the second body 620 and screwed with the shaft 654*b* of the crimping member 654. A crimping module 650 is composed of the base 651, the adjustment member 653, and the crimping member 654 in the embodiment.

Here, the first body 110, the linking members 141 and 142, the base 651, and the adjustment member 653 are the same with members illustrated in the above embodiments, wherein different from the foregoing embodiment, in the crimping module 650 and the second body 620 of this embodiment, the limiting member 621 is a recess or a rail extending along an axis in the second body 620, and the crimping portion 654*a* has a pillar 654*c* movably coupled to the recess so as to move along the axis (a process shown from FIG. 13A to FIG. 13B or from FIG. 13B to FIG. 13A).

According to the disposition of the members above, when the adjustment member 653 being forced by an user to be rotated, the crimping member 654 moves along the axis only without rotating about the axis because of the crimping member 654 being partially interfered with the limiting member 621 and having only one degree of freedom of movement along the axis. That's to say, the limiting member 621 is a fixed structure in the second body 620 differing from the limiting member, the base B1, being moved in the second body in the above embodiments.

In view of the foregoing, in the embodiments of the invention, the crimping module is disposed in the body of the crimping hand tool, and the crimping module includes the movable base and the adjustment member and the crimping member assembled on the base. Since the crimping member is inserted in the base and is screwed with the adjustment member, the position of the crimping member in the body can be changed through operating on the adjustment member. Further, the limiting structures fitted to each other exist between the base and the crimping member of the crimping module. Hence, when the user rotates the adjustment member to drive the crimping member, the limiting structures may effectively prevent the crimping member from rotating along with rotation of the adjustment member. That is, the crimping member is limited to generate linear movement only, so that adjustment on the crimping module may be smoothly performed.

Through the adjustment member, the user may enable the crimping member to be adjusted to a corresponding state matched with the required sizes and specifications. In this way, even if the sizes and specifications of the coaxial cable change, the user only has to perform the adjustment action, and then the crimping member is enabled to be matched with the different sizes and specifications of the coaxial cable. It thus can be seen that a simple structure may enable the state of the crimping hand tool to be changed to correspond to the coaxial cable. Therefore, inconvenience caused by the need of preparing different replacement parts at any time is avoided, and convenience and crimping efficiency of the crimping hand tool are enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A crimping hand tool, configured to crimp a cable and a connector together, comprising:

a first body;

a second body, pivoted to the first body;

a limiting member, disposed in the second body;

a crimping member, movably disposed in the second body and linked with the first body, the crimping member being partially interfered with the limiting member; and an adjustment member, disposed in the second body, rotating about an axis, and screwed with the crimping member, wherein the adjustment member being forced by an user to adjust a position of the crimping member in the second body along the axis, wherein the limiting member is a recess disposed in the second body and extending along the axis, and the crimping member has a protrusion movably coupled to the recess along the axis.

2. The crimping hand tool as claimed in claim 1, wherein the limiting member is movably disposed in the second body along the axis, and the crimping member and the adjustment member are disposed on the limiting member, wherein the limiting member has a first limiting structure, the crimping member has a second limiting structure, and the first limiting structure and the second limiting structure are fitted to each other so that the crimping member moves along the axis only without rotating when the adjustment member being rotated about the axis.

3. The crimping hand tool as claimed in claim 2, wherein the first limiting structure is a groove in the limiting member extending along the axis, and the second limiting structure is a protruding portion of the crimping member movably coupled to the groove.

4. The crimping hand tool as claimed in claim 2, wherein the first limiting structure and the second limiting structure are respectively a protruding switch structure and a switch channel, and vice versa, such that the protruding switch structure being movably adapted to the switch channel.

5. The crimping hand tool as claimed in claim 2, wherein the first limiting structure is a protruding portion on an inner wall in the limiting member, the second limiting structure is a side plane of the crimping member, and the protruding portion being movably adapted to the side plane.

6. The crimping hand tool as claimed in claim 2, wherein the limiting member is a base of a crimping module, and the crimping module further comprises the adjustment member and the crimping member, wherein the adjustment member is rotatably disposed at the base about the axis, and the crimping member is movably assembled to the base along the axis.

* * * * *